United States Patent
Arthur et al.

(10) Patent No.: US 12,403,495 B2
(45) Date of Patent: Sep. 2, 2025

(54) INKJET PRINTING VEHICLE LIVERY

(71) Applicant: The Boeing Company, Chicago, IL (US)

(72) Inventors: Shane Edward Arthur, Kirkland, WA (US); Matthew Mellin, Seattle, WA (US); John Eric Miller, Savannah, OH (US); Kjersta Larson-Smith, Seattle, WA (US)

(73) Assignee: The Boeing Company, Arlington, VA (US)

( * ) Notice: Subject to any disclaimer, the term of this patent is extended or adjusted under 35 U.S.C. 154(b) by 143 days.

(21) Appl. No.: 17/937,237

(22) Filed: Sep. 30, 2022

(65) Prior Publication Data

US 2024/0109095 A1    Apr. 4, 2024

(51) Int. Cl.
*B05B 16/40*    (2018.01)
*B05D 7/00*    (2006.01)
*B05B 13/04*    (2006.01)
*B05D 1/26*    (2006.01)

(52) U.S. Cl.
CPC ............... *B05B 16/40* (2018.02); *B05D 7/53* (2013.01); *B05B 13/0431* (2013.01); *B05D 1/26* (2013.01)

(58) Field of Classification Search
None
See application file for complete search history.

(56) References Cited

U.S. PATENT DOCUMENTS

| | | | |
|---|---|---|---|
| 4,023,394 A * | 5/1977 | Borup | B21D 1/14 72/457 |
| 5,989,643 A | 11/1999 | Nakagawa et al. | |
| 6,446,912 B1 * | 9/2002 | Barich | B61L 27/57 246/2 R |
| 2002/0007788 A1 * | 1/2002 | Nonomura | B05B 12/14 118/698 |
| 2004/0159555 A1 * | 8/2004 | Purdy | B05D 7/16 205/198 |

(Continued)

FOREIGN PATENT DOCUMENTS

DE    102013004144 A1    9/2014
EP    3670204 A1    6/2020

(Continued)

OTHER PUBLICATIONS

Extended European Search Report dated Mar. 1, 2024, regarding Application 23198111.9, 31 pages.

(Continued)

*Primary Examiner* — Michael B Cleveland
(74) *Attorney, Agent, or Firm* — Yee & Associates, P.C.

(57) ABSTRACT

The present disclosure includes a method and apparatus for changing livery on a vehicle. A method of inkjet printing an exterior surface of a vehicle, includes preparing at least a portion of the exterior surface of the vehicle in a first bay using crossflow or downflow air handling and using explosion protected equipment. That method includes inkjet printing at least the portion of the exterior surface of the vehicle in a second bay. This method includes clear-coating at least the portion of the exterior surface of the vehicle in a third bay using downflow or crossflow air handling, using air filtration and using explosion protected equipment.

21 Claims, 9 Drawing Sheets

(56) References Cited

U.S. PATENT DOCUMENTS

| | | | |
|---|---|---|---|
| 2006/0219525 A1* | 10/2006 | Dohi | B65G 9/004 |
| | | | 198/685 |
| 2015/0259941 A1* | 9/2015 | Hanson | B05B 13/0221 |
| | | | 52/31 |
| 2017/0203580 A1 | 7/2017 | Martins Pinto et al. | |
| 2018/0016987 A1 | 1/2018 | Howarth et al. | |
| 2018/0201029 A1* | 7/2018 | Mathis | B41J 2/01 |
| 2019/0299231 A1 | 10/2019 | Fritz et al. | |
| 2020/0324915 A1* | 10/2020 | Wright | B66F 9/063 |
| 2024/0109349 A1 | 4/2024 | Arthur et al. | |

FOREIGN PATENT DOCUMENTS

| | | | |
|---|---|---|---|
| GB | 2465570 A * | 5/2010 | B66F 7/10 |
| JP | 5204575 B2 | 6/2013 | |
| WO | 2011018199 A1 | 2/2011 | |

OTHER PUBLICATIONS

Extended European Search Report dated Mar. 1, 2024, regarding Application No. 23198132.5, 10 pages.

* cited by examiner

INKJET PRINTING VEHICLE LIVERY

CROSS-REFERENCE TO RELATED APPLICATIONS

This application is related to the following patent application entitled "ROBOTICS FOR INKJET PRINTING VEHICLE LIVERY", U.S. Ser. No. 17/937,227, filed Sep. 30, 2022 and assigned to the same assignee. The aforementioned application is incorporated herein by reference in its entirety for all purposes.

BACKGROUND INFORMATION

1. Field

The present disclosure relates generally to applying designs, such as identifying designs on the exterior of transportation equipment. More particularly, the present disclosure relates to applying livery on vehicles. Still more particularly, the present disclosure relates to methods and apparatus for printing livery on aircraft using inkjet printing technology. The description provides a disclosure of an inkjet printing process allowing for up to 360° of inkjet printing of a vehicle.

2. Background

Transportation equipment such as aircraft are usually seen in public by many people and are typically painted with a paint scheme or design to raise public awareness of the origin of the service affiliated with the equipment. Livery is an identifying design that designates ownership or affiliation. When new transportation equipment is delivered, the original owner or lessee usually wants to apply livery to identify the origin of their service. Similarly, when the owner or lessee of transportation equipment changes, the new management of that equipment usually wants to change the livery to identify the origin of the new service. Consequently, there is a need for technology to apply attractive, durable livery in an economical manner.

In the past, livery has been applied to exterior surfaces of transportation equipment by spray painting. A practical constraint of spray painting is that preparation of the surface requires expensive infrastructure such as specific air flow patterns and explosion proof equipment. The spray-painting operation itself has infrastructure requirements. Another practical constraint of spray painting is that clear-coating over the livery also requires air filtration, specific air flow patterns and explosion proof equipment. There is a need to reduce these infrastructure costs.

Another issue with spray painting is that all the individual operations require time. Initial preparation, subsequent preparation, painting and clear coating all take time. In particular, drying time is required. There is a need to reduce time requirements to increase throughput and reduce overall costs.

Another issue with spray painting livery is that the spray paint equipment needs to be repositioned over the surface of the vehicle to cover the entire surface. Transportation vehicles can be large, and the movement of equipment is nontrivial because of their size and weight and because of lost time. There is a need to reduce the need for repositioning equipment.

Another issue with spray painting livery is that existing robotic manipulators are not optimized for large vehicles. Transportation vehicles have exterior features such as lights, antennas, and other obstructions. There is a need for robotic manipulators that accommodate obstructions and simultaneously provide optimum approach to the exterior surface with regard to both direction and distance.

Another issue with spray painting livery is that individual operations may have sub-steps that have different requirements. The sub-steps may be required across a large surface area that is beyond the reach of just one robotic manipulator. There is a need for arranging these sub-steps in sequence with regard to surface area elements.

Another issue with spray painting livery is that edge resolution and minimum size of features is constrained by the spray paint equipment. There is a need to improve resolution of livery colors.

Another issue with spray painting livery is that, in embodiments, the number of different colors that can be utilized per unit surface area is in practice limited by the spray paint equipment. There is a need for a more spatially agile pallet of colors.

Therefore, it would be desirable to have methods and apparatus that take into account at least some of the issues discussed above, as well as other possible issues. For example, it would be desirable to have methods and apparatus that overcome technical problems with applying livery on aircraft and other transportation equipment.

SUMMARY

An embodiment of the present disclosure provides a method of inkjet printing an exterior surface of a vehicle, comprising: preparing at least a portion of the exterior surface of the vehicle in a first bay using crossflow or downflow air handling and using explosion protected equipment; inkjet printing at least the portion of the exterior surface of the vehicle in a second bay; and clear-coating at least the portion of the exterior surface of the vehicle in a third bay using downflow or crossflow air handling, using air filtration and using explosion protected equipment.

In another embodiment of the present disclosure, an apparatus for inkjet printing an exterior surface of a vehicle, comprises: a first bay comprising crossflow or downflow air handling equipment and explosion protected equipment; a second bay coupled to the first bay, the second bay comprising inkjet printing equipment; and a third bay coupled to the second bay, the third bay comprising clear-coating equipment, downflow or crossflow air handling equipment, air filtration equipment, and explosion protected equipment.

In yet another embodiment of the present disclosure, a method of inkjet printing an exterior surface of an aircraft, comprises: preparing at least a portion of the exterior surface of the aircraft in a first bay using crossflow or downflow air handling and using explosion protected equipment; inkjet printing at least the portion of the exterior surface of the aircraft in a second bay; and clear-coating at least the portion of the exterior surface of the aircraft in a third bay using downflow or crossflow air handling, using air filtration and using explosion protected equipment.

In still another embodiment of the present disclosure, an apparatus for inkjet printing an exterior surface of an aircraft, comprises: a first bay comprising crossflow or downflow air handling equipment and explosion protected equipment; a second bay coupled to the first bay, the second bay comprising inkjet printing equipment; and a third bay coupled to the second bay, the third bay comprising clear-coating equipment, downflow or crossflow air handling equipment, air filtration equipment, and explosion protected equipment.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations as described below. For example, FIG. 1, is a block diagram of a multi-bay environment 100 depicted in accordance with an illustrative embodiment.

Figure 1:
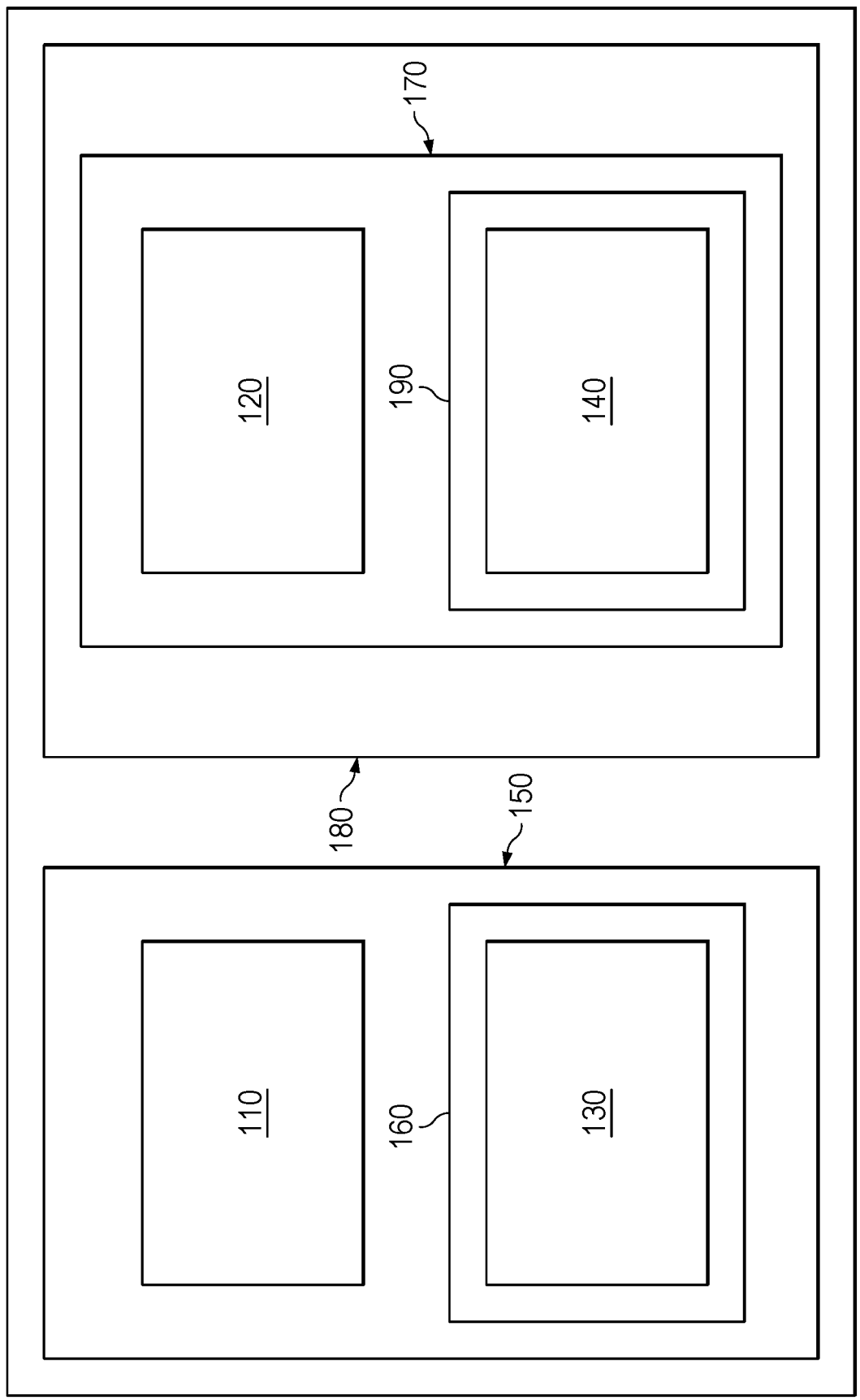
FIG. 1 is an illustration of a block schematic diagram environment for inkjet printing of livery in accordance with an illustrative embodiment.

FIG. 1 shows an initial preparation bay 110. A preparations bay 120 is coupled to the initial preparation bay. An inkjet printing bay 130 is coupled to the preparation bay. A clear coat bay 140 is coupled to the inkjet bay. While the bays may be mechanically connected to one another, for example in a single series, there are alternative embodiments where the bays would be separated apart from one another or a subset of the bays would be separated apart from the others.

The initial preparation bay 110 and the inkjet printing bay 130 are services by a subsurface facility 150. The subsurface facility 150 can include sewer, sump and/or open pit facilities. The inkjet printing bay 130 is located within crossbeam facility 160. The crossbeam facility 160 includes a number of cross beams, and for example, 2 cross beams. The initial preparation bay 110 is not serviced by the crossbeam facility. The initial preparation bay 110 has no crossbeams, but may include a sump, sewer and/or a decanting tank.

The preparations bay 120 and the clear coat bay 140 are serviced by down air flow or cross air flow facility 170. The preparations bay 120 and the clear coat bay 140 are also serviced by C1D1 explosion proof facilities 180. The clear coat bay 140 is serviced by air filtration facility 190.

Figure 2:
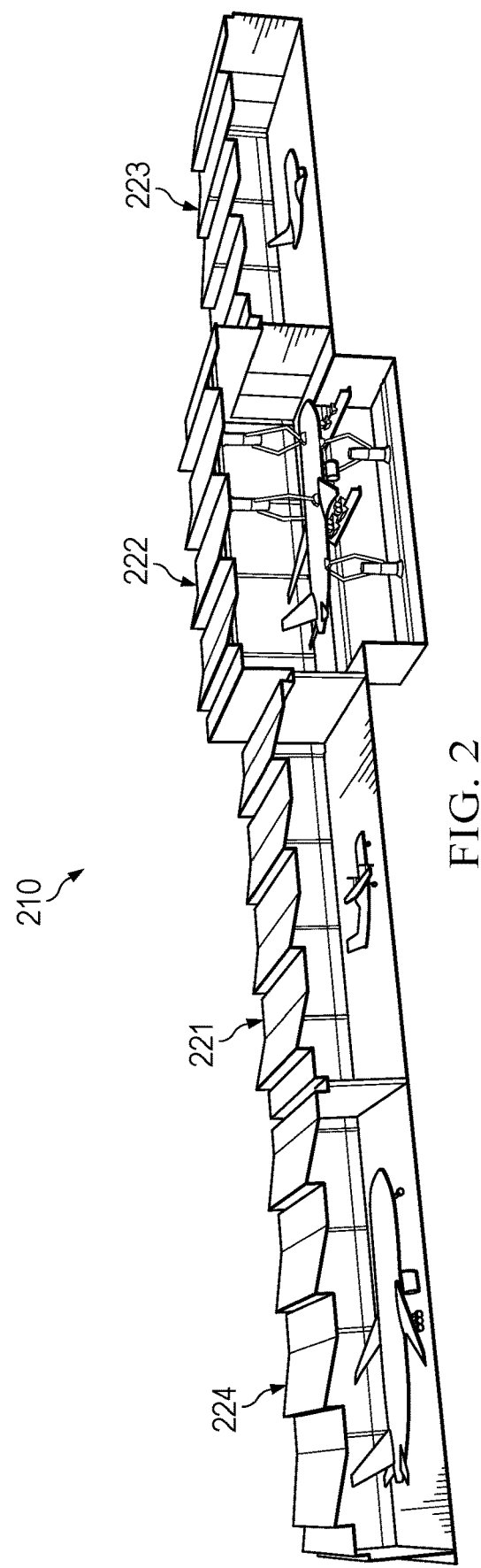
FIG. 2 is an illustration of an isometric open side view of a 4-bay hanger for inkjet printing of livery in accordance with an illustrative embodiment.

FIG. 2 shows an isometric open side view of a multi-bay hanger 210 configured for inkjet printing of livery on an exterior surface of a vehicle. The design shown in FIG. 2 depicts an in-line inkjet printing 4-bay facility. Other embodiments including more than 4 or less than 4 bays are intended to be included herein. For example, in embodiments, the system can include 3 bays such as 224, 222 and 223. Alternatively, additional bays may be added at various locations in the system for specialty painting, inkjet printing, repair or the like. Bay one 221 includes crossflow or downflow air handling equipment and explosion protected equipment. For example, the explosion protected equipment can include C1D1 certified explosion proof equipment. In bay 221, for example, a base coat may be applied.

Bay two 222 coupled to the first bay includes inkjet printing equipment. The inkjet printing equipment for inkjet printing of livery can include a first track located overhead, a second track located in an open pit and a number of reversibly moveable monuments (aka towers) having manipulators with inkjet print head array end effectors. There can be 1, 2, 3, 4 or more reversibly moveable monuments. The open pit dimensions, in embodiments, may include a width of from about 75 to about 150 feet, or about 90 to about 125, or about 100 to about 110 feet wide; a length of from about 200 to about 350 feet, or about 250 to about 325 feet, or from about 275 to about 300 feet; and a depth of from about 40 to about 75 feet, or from about 50 to about 70 feet, or from about 60 to about 65 feet. In the illustrated embodiment, an aircraft is located on reversibly moveable cross beams that span the open pit.

In embodiments, the pit has the width exceeding the width of an airplane including wingspan, and a depth to allow for inkjet printing on the underside of the airplane. For example, the dimensions of the pit may include a width about 20' wider than wingspan and a depth that is about half the width.

Bay three 223 coupled to bay two includes clear-coating equipment, downflow or crossflow air handling equipment, air filtration equipment, and explosion protected equipment. Bay four 224 coupled to bay one includes crossflow or downflow air handling equipment and optionally explosion protected equipment. The primary purpose of the optional fourth bay is preliminary preparation where a vehicle already has old primer, paint and/or livery colors that need to be removed before the preparation operations of bay one 221.

Figure 3:
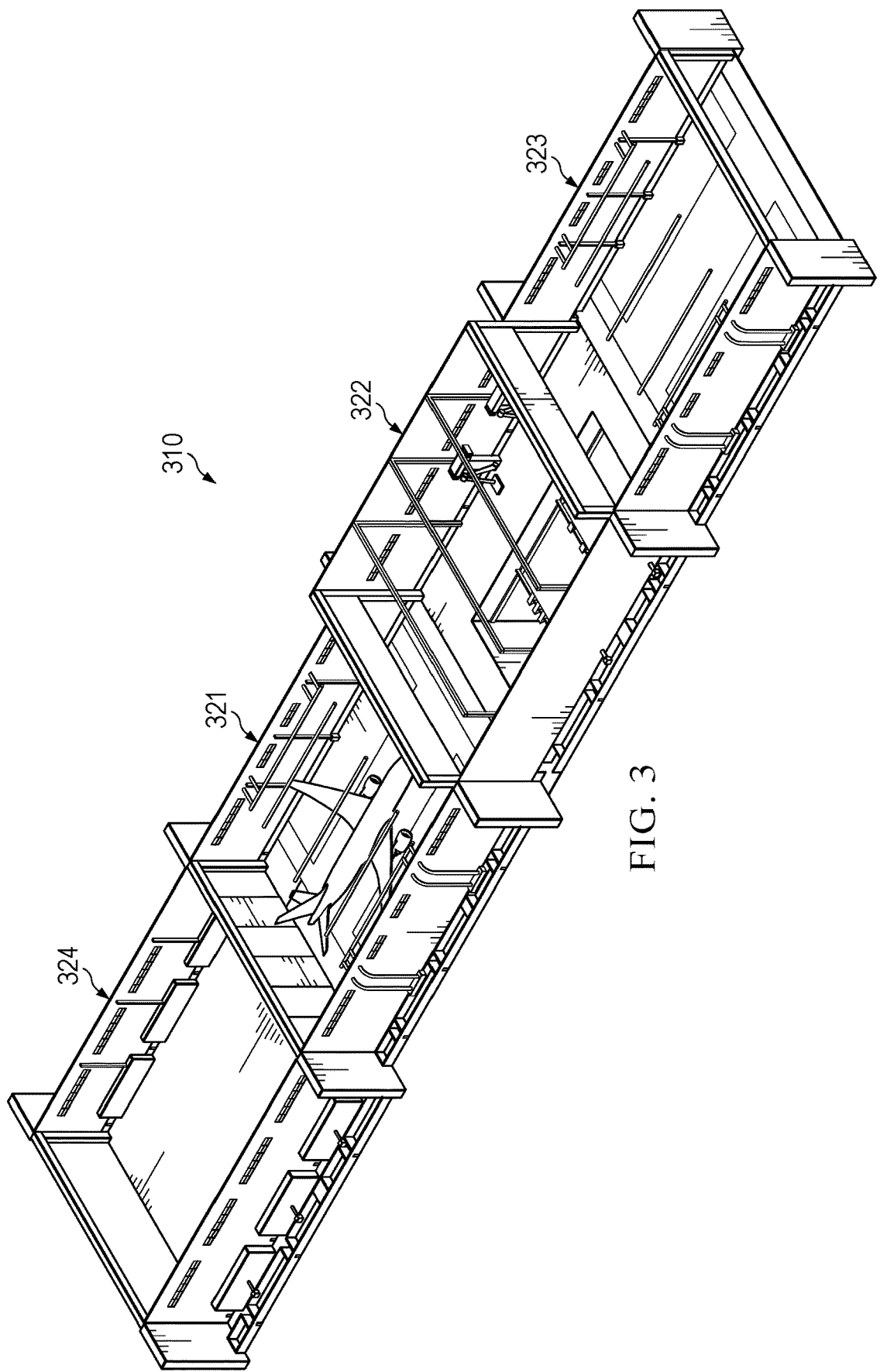
FIG. 3 is an illustration of an isometric open top view of another 4-bay hanger for inkjet printing of livery in accordance with an illustrative embodiment.

FIG. 3 shows an isometric open top view of a 4-bay hanger 310 configured for inkjet printing of livery on an exterior surface of a vehicle. Each bay is specialized for its unique process flow. An optional first bay 321 includes crossflow or downflow air handling equipment and explosion protected equipment. The operations in the first bay can include surface preparation, priming and base coat. A second bay 322 is coupled to the first bay and includes inkjet printing equipment. The operations in the third bay can include inkjet printing of livery as well as inkjet printing other images, or solid-color inkjet printing. A third bay 323 coupled to the second bay includes clear-coating equipment, downflow or crossflow air handling equipment, air filtration equipment, and explosion protected equipment. A fourth bay 324 is coupled to the first bay and includes crossflow or downflow air handling equipment and explosion protected equipment.

Figure 4:
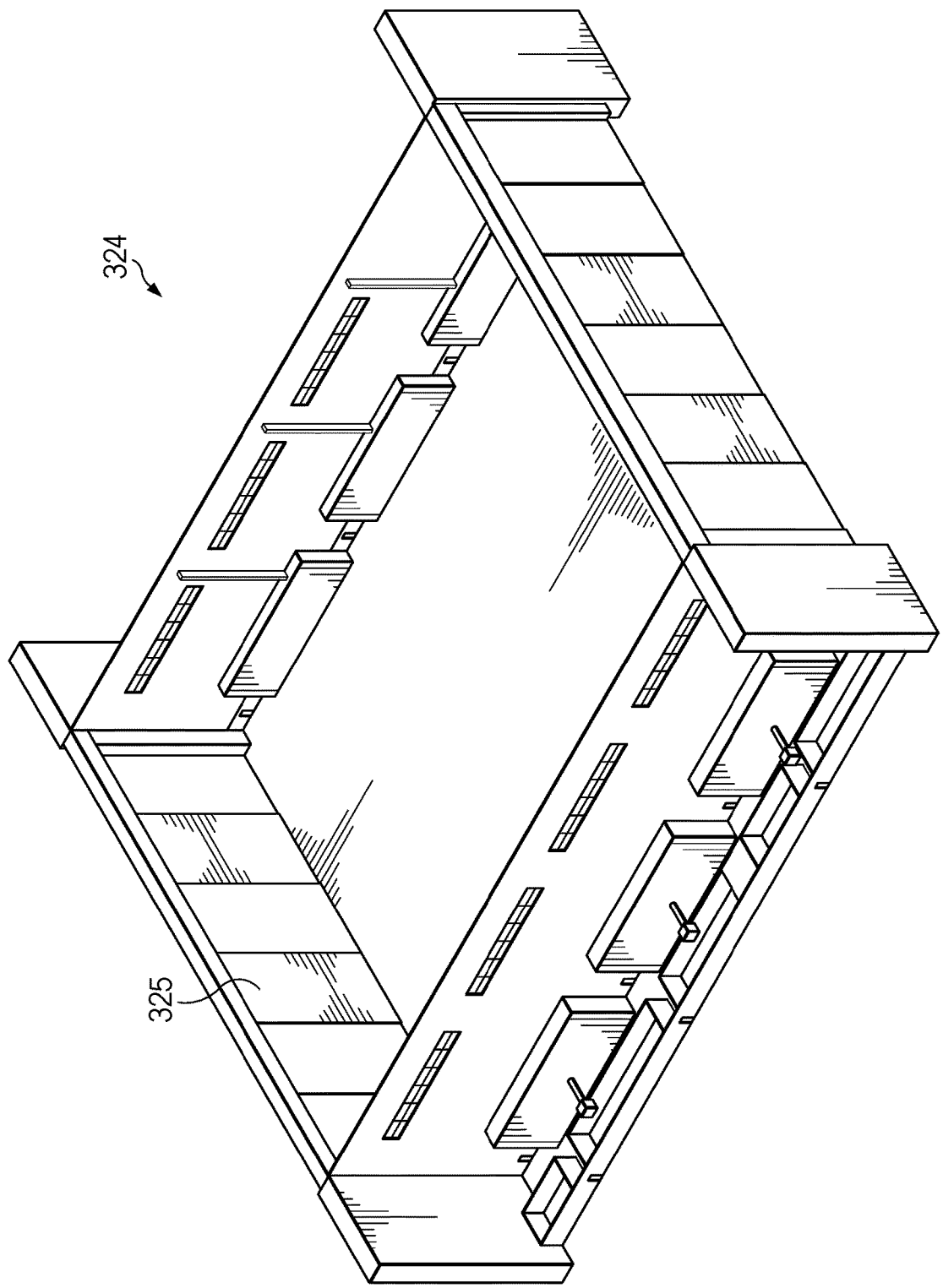
FIG. 4 is an illustration of an isometric open top view of a bay for preliminary preparation for inkjet printing of livery in accordance with an illustrative embodiment.

FIG. 4 shows an isometric open top view of the fourth bay 324. This fourth bay is optional, and the primary purpose of the fourth bay is where a vehicle already has old primer, old paint and/or old livery colors that need to be removed. If present, a vehicle enters the fourth bay through doors 325. This is an initial preparation bay for preliminary preparation for inkjet printing livery colors. The removal can include de-painting, de-inking and/or sanding. When present, the fourth bay 324 gives embodiments of this disclosure the capability of repainting and/or changing livery (design and/or colors) on previously owned vehicles. The air handling is, in examples, cross-flow but could be down-flow or both. The operations in the fourth bay can include stripping. Thus, embodiments of this specification can apply livery colors to previously owned vehicles as well as new vehicles. The fourth bay may include water service and hoses for distribution fluids. The fourth bay, in embodiments, includes a sump and sewer system. The fourth bay may include a decanting tank for processing fluid.

Figure 5:
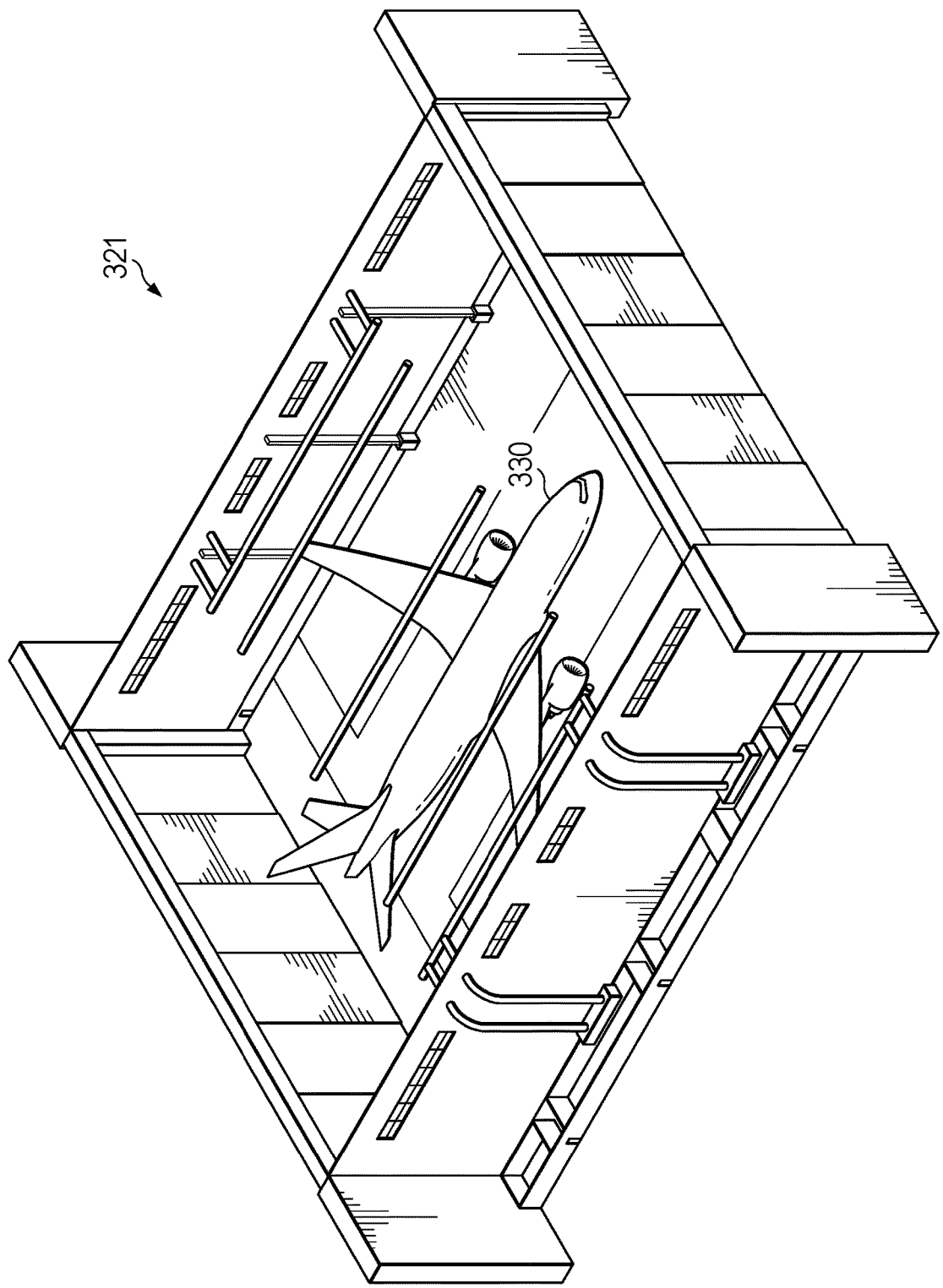
FIG. 5 is an illustration of an isometric open top view of a bay for secondary preparation for inkjet printing of livery in accordance with an illustrative embodiment.

FIG. 5 shows an isometric open top view of the first bay 321. An aircraft 330 is depicted in the first bay. This bay is for surface preparation for inkjet printing of livery. The surface preparation can include activating, adhesion promoting, priming, and base-coating, or the like. The air handling is, for example, cross-flow but can be down-flow or both. The first bay may include air filtration. The first bay, for example, includes explosion protected equipment.

Figure 6:
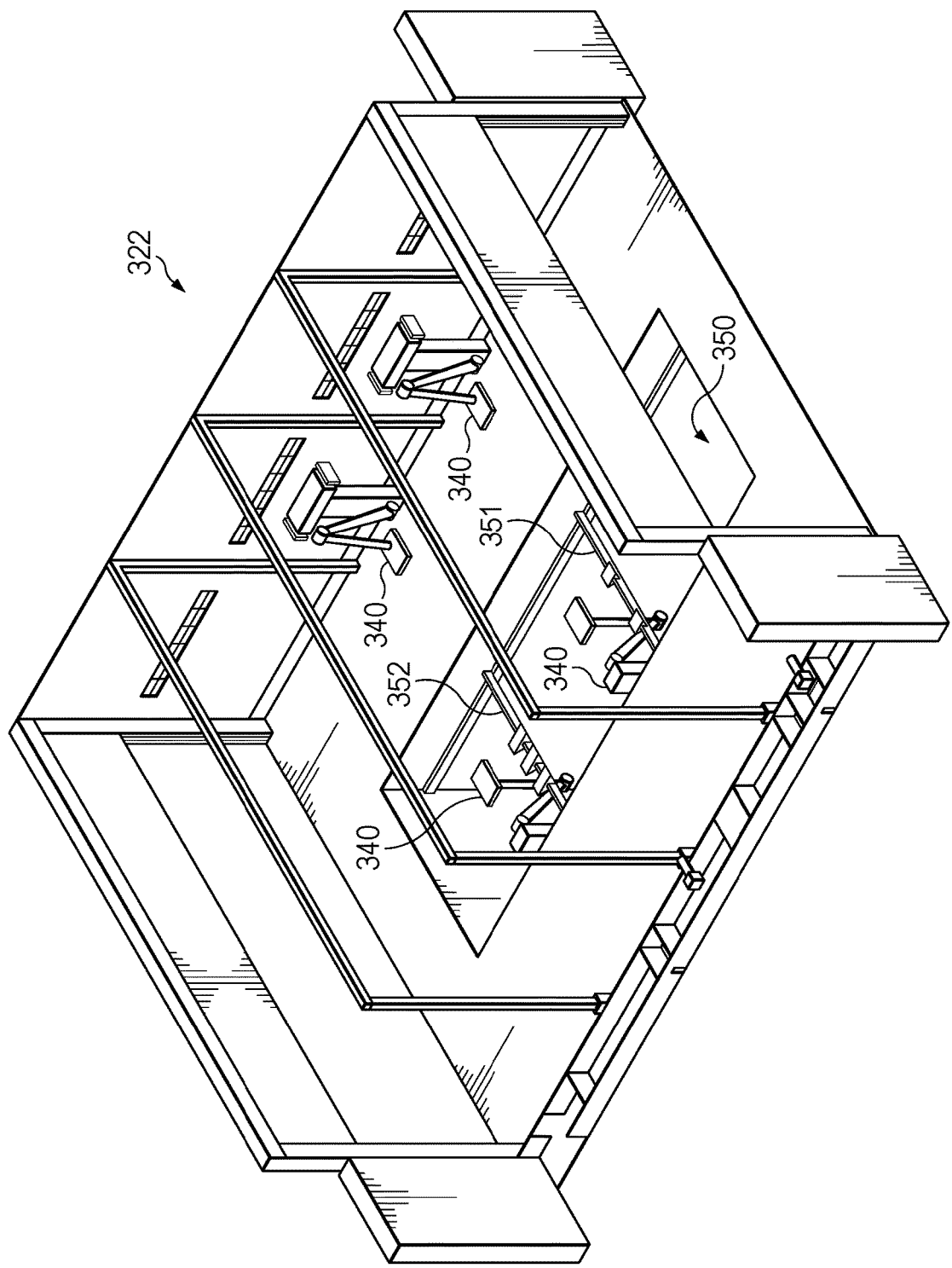
FIG. 6 is an illustration of an isometric open top view of a bay for inkjet printing of livery on an exterior surface of a vehicle in accordance with an illustrative embodiment.

FIG. 6 shows an isometric open top view of the second bay 322. This bay is intended for inkjet printing. This bay includes a number of monuments 340 each of which positions an end effector that can include a number of inkjet print heads. The second bay 322 includes an open pit 350. In this embodiment there are 2 monuments located in the open pit 350. In this embodiment there are 2 more monuments located above the open pit. Thus, the end effectors of the monuments can reach and access all areas of the exterior surface of a vehicle.

A first reversibly moveable crossbeam 351 is reversibly movable along the length of the open pit 350. A second reversibly moveable crossbeam 352 is reversibly movable along the length of the open pit 350. In use, a method can include mechanically connecting the vehicle to the first reversibly moveable crossbeam before inkjet printing, moving the first reversibly moveable crossbeam and the vehicle, mechanically connecting the vehicle to the second reversibly moveable crossbeam, and moving the first reversibly moveable crossbeam, the second reversibly moveable crossbeam and the vehicle.

The second bay, in embodiments, includes an automation cell to coordinate and control operations. The second bay may include air filtration. The second bay, in examples, includes explosion protected equipment.

Figure 7:
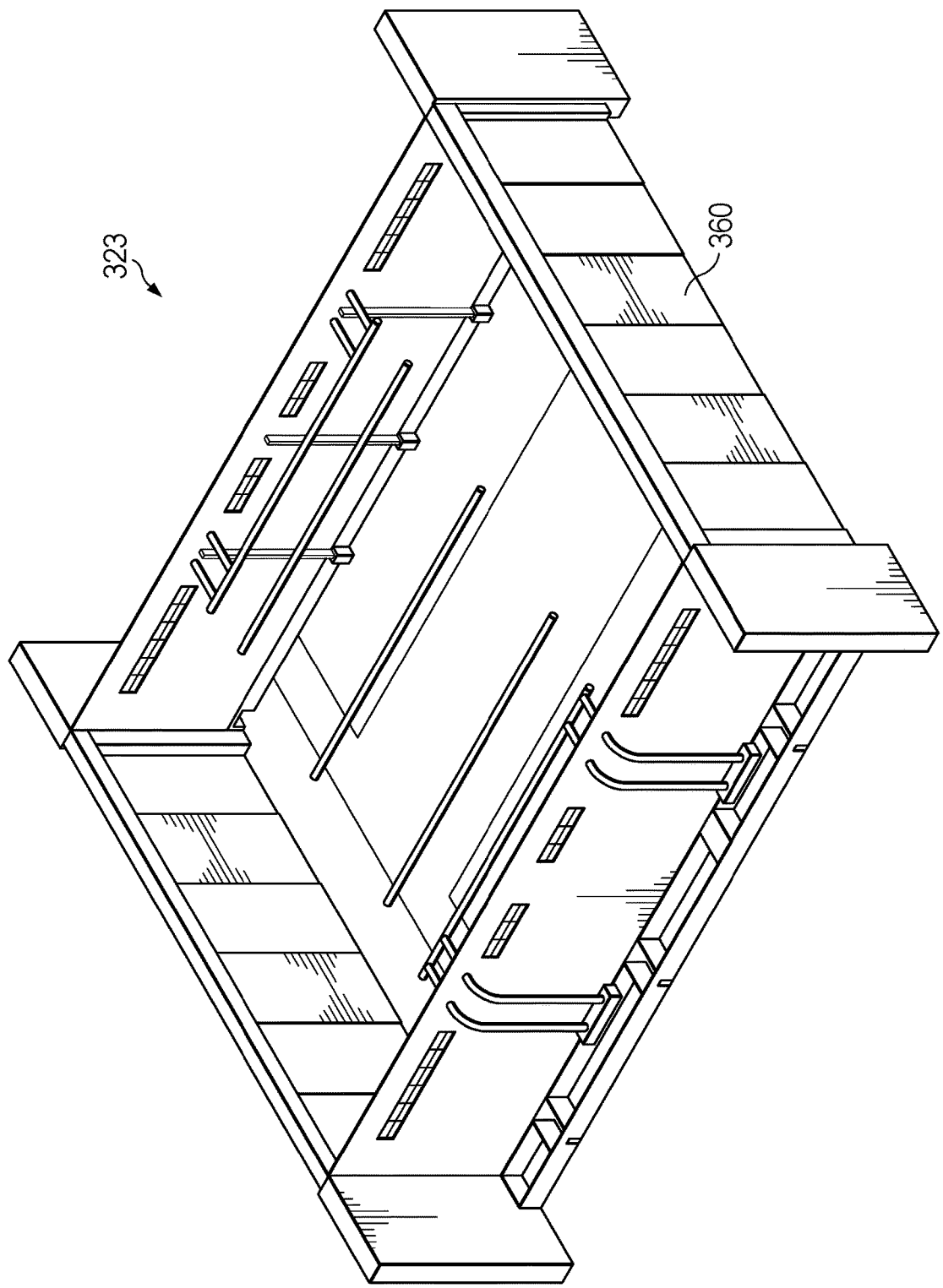
FIG. 7 is an illustration of an isometric open top view of a bay for clear-coating on top of inkjet printing of livery in accordance with an illustrative embodiment.

FIG. 7 shows an isometric open top view of the third bay 323. This bay may be for clear-coating, for example over inkjet printed livery. This bay may also be intended for repair, touchup, and cleanup, or an additional bay may be added for repair, specialty colors, and the like. The air handling may include down-flow but can be cross-flow or both. The third bay, in embodiments, includes air filtration equipment. The third bay may include explosion protected equipment. The clear-coated vehicle exits via doors 360.

Figure 8:
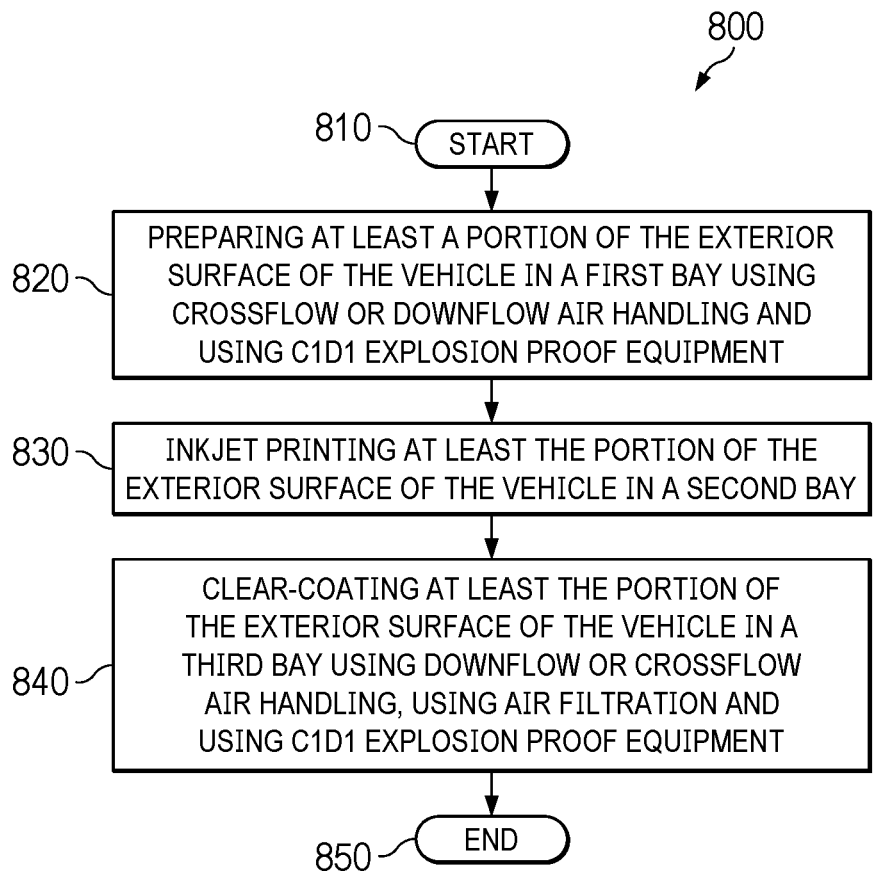
FIG. 8 is an illustration of a flowchart of a process for inkjet printing an exterior surface of a vehicle in accordance with an illustrative embodiment.

FIG. 8 shows a flowchart of a process 800 for inkjet printing an exterior surface of a vehicle. The process begins at start operation 810. At operation 820 the process includes preparing at least a portion of the exterior surface of the vehicle in a first Bay using cross flow or downflow air handling and using explosion protected equipment. At operation 830 the process includes inkjet printing at least the portion of the exterior surface of the vehicle in a second Bay. At operation 840 the process includes clear-coating at least the portion of the exterior surface of the vehicle in a third Bay using downflow or cross flow air handling, using air filtration, and using C1D1 explosionproof equipment. The process terminates at stop operation 850.

Figure 9:
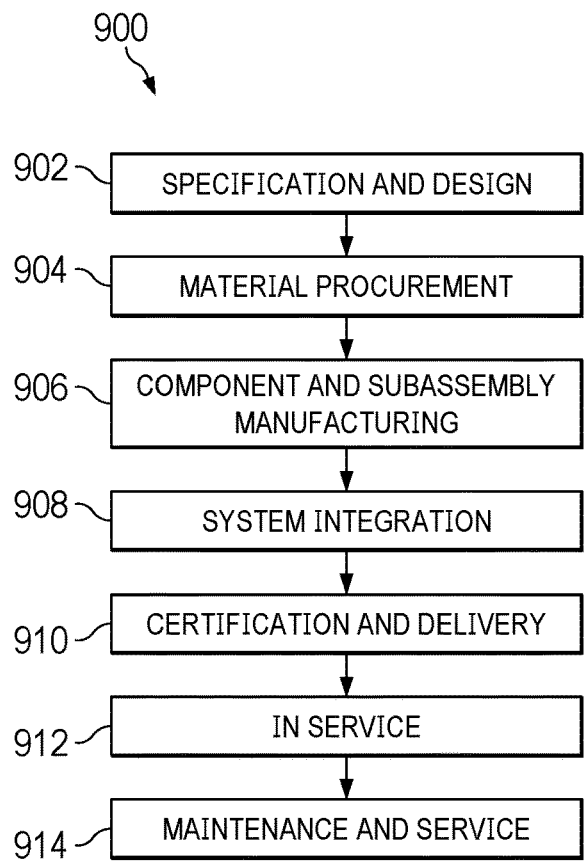
FIG. 9 is an illustration of an aircraft manufacturing and service method in accordance with an illustrative embodiment.
Figure 10:
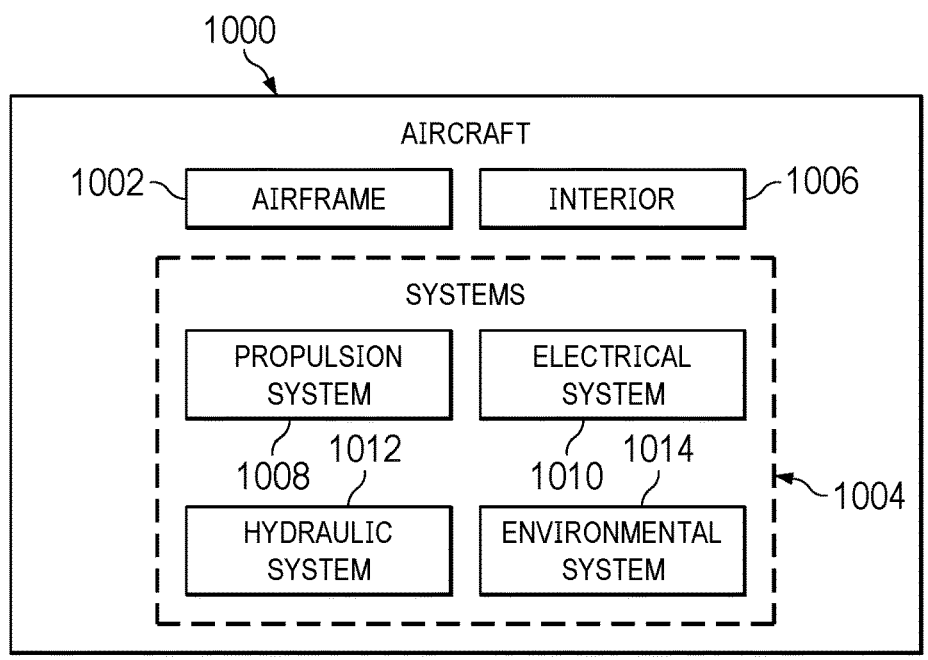
FIG. 10 is an illustration of a block diagram of an aircraft upon which an illustrative embodiment may be implemented.

Illustrative embodiments of the disclosure may be described in the context of aircraft manufacturing and service method 900 as shown in FIG. 9 and aircraft 1000 as shown in FIG. 10. Turning first to FIG. 9, an illustration of an aircraft manufacturing and service method is depicted in accordance with an illustrative embodiment. During pre-production, aircraft manufacturing and service method 900 may include specification and design 902 of aircraft 1000 in FIG. 10 and material procurement 904.

During production, component and subassembly manufacturing 906 and system integration 908 of aircraft 1000 in FIG. 10 takes place. Thereafter, aircraft 1000 in FIG. 10 can go through certification and delivery 910 in order to be placed in service 912. While in service 912 by a customer, aircraft 1000 in FIG. 10 is scheduled for routine maintenance and service 914, which may include modification, reconfiguration, refurbishment, and other maintenance or service.

Each of the processes of aircraft manufacturing and service method 900 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 10, an illustration of an aircraft is depicted in which an illustrative embodiment may be implemented. In this example, aircraft 1000 is produced by aircraft manufacturing and service method 900 in FIG. 9 and may include airframe 1002 with plurality of systems 1004 and interior 1006. Examples of systems 1004 include one or more of propulsion system 1008, electrical system 1010, hydraulic system 1012, and environmental system 1014. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 900 in FIG. 9.

In one illustrative example, components or subassemblies produced in component and subassembly manufacturing 906 in FIG. 9 can be fabricated or manufactured in a manner similar to components or subassemblies produced while aircraft 1000 is in service 912 in FIG. 9. As yet another example, one or more apparatus embodiments, method embodiments, or a combination thereof can be utilized during production stages, such as component and subassembly manufacturing 906 and system integration 908 in FIG. 9. One or more apparatus embodiments, method embodiments, or a combination thereof may be utilized while aircraft 1000 is in service 912, during maintenance and service 914 in FIG. 9, or both. The use of a number of the different illustrative embodiments may substantially expedite the assembly of aircraft 1000, reduce the cost of aircraft 1000, or both expedite the assembly of aircraft 1000 and reduce the cost of aircraft 1000.

In embodiments, an ink such as a liquid or solid ink, may be dispensed through the inkjet printheads of the inkjet printing system described herein. Inks of various colors can be used in the inkjet printing herein, including cyan, magenta, yellow, black, red, purple, pink, orange, grey, and the like. In addition, fluorescent ink colors can be used. In other embodiments, a metallic ink can be used such as gold, silver, bronze or the like ink colors.

In embodiments, decorative livery may be printed on a vehicle using the processes described herein, and may include inkjet printing of a variety of colors to provide an inkjet printed livery design on the vehicle.

In embodiments, the robotic arms containing end effectors with printheads may be used in sequence or simultaneously.

In embodiments, the inkjet printing devices and processes herein including the pit 350 allow for up to 360° inkjet printing of a vehicle, including inkjet printing front, back, sides, topside and underside of a vehicle. Moreover, the inkjet printing devices and processes herein provide for detailed printing of curved surfaces, and printing around obstructions.

As used herein, "a number of" when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of inkjet printing an exterior surface of a vehicle, comprising:
    preparing at least a portion of the exterior surface of the vehicle in a first bay using crossflow or downflow air handling and using explosion protected equipment;
    inkjet printing at least the portion of the exterior surface of the vehicle in a second bay;
    closing doors between the first bay and the second bay before preparing;
    opening doors between the first bay and the second bay after preparing;
    closing doors between the first bay and the second bay before inkjet printing;
    clear-coating at least the portion of the exterior surface of the vehicle in a third bay using downflow or crossflow air handling, using air filtration and using explosion protected equipment;
    opening doors between the second bay and the third bay after inkjet printing;
    closing doors between the second bay and the third bay before clear-coating; and
    mechanically connecting the vehicle to a first reversibly moveable crossbeam before inkjet printing, wherein the first reversibly moveable crossbeam is located in the second bay in an open pit and the first reversibly moveable crossbeam is reversibly movable along a length of the open pit,
    wherein the first reversibly moveable crossbeam spans the open pit, and the vehicle is located on the first reversibly moveable crossbeam.

2. The method of claim 1, further comprising removing paint and inspecting at least the portion of the exterior surface of the vehicle in a fourth bay before preparing.

3. The method of claim 1, wherein preparing comprises activating, adhesion promoting, priming, and base-coating.

4. The method of claim 1, further comprising moving the first reversibly moveable crossbeam and the vehicle.

5. The method of claim 4, further comprising mechanically connecting the vehicle to a second reversibly moveable crossbeam, wherein the second bay comprises a first track located above both the first reversibly moveable crossbeam and the second reversibly moveable crossbeam.

6. The method of claim 5, further comprising moving the first reversibly moveable crossbeam, the second reversibly moveable crossbeam and the vehicle, wherein the second reversibly moveable crossbeam spans the open pit, and the vehicle is located on the second reversibly moveable crossbeam.

7. A method of inkjet printing an exterior surface of an aircraft, comprising:
    preparing at least a portion of the exterior surface of the aircraft in a first bay using crossflow or downflow air handling and using explosion protected equipment;
    inkjet printing at least the portion of the exterior surface of the aircraft in a second bay;
    closing doors between the first bay and the second bay before preparing;
    opening doors between the first bay and the second bay after preparing;

closing doors between the first bay and the second bay before inkjet printing;

clear-coating at least the portion of the exterior surface of the aircraft in a third bay using downflow or crossflow air handling, using air filtration and using explosion protected equipment;

opening doors between the second bay and the third bay after inkjet printing;

closing doors between the second bay and the third bay before clear-coating; and mechanically connecting the aircraft to a first reversibly moveable crossbeam before inkjet printing, wherein the first reversibly moveable crossbeam is located in the second bay in an open pit and the first reversibly moveable crossbeam is reversibly movable along a length of the open pit, wherein the first reversibly moveable crossbeam spans the open pit, and the aircraft is located on the first reversibly moveable crossbeam.

8. The method of claim 7, further comprising removing paint and inspecting at least the portion of the exterior surface of the aircraft in a fourth bay before preparing.

9. The method of claim 7, wherein preparing comprises activating, adhesion promoting, priming, and base-coating.

10. The method of claim 7, further comprising moving the first reversibly moveable crossbeam and the aircraft.

11. The method of claim 10, further comprising mechanically connecting the aircraft to a second reversibly moveable crossbeam, wherein the second bay comprises a first track located above both the first reversibly moveable crossbeam and the second reversibly moveable crossbeam.

12. The method of claim 11, further comprising moving the first reversibly moveable crossbeam, the second reversibly moveable crossbeam and the aircraft, wherein the second reversibly moveable crossbeam spans the open pit, and the aircraft is located on the second reversibly moveable crossbeam.

13. The method of claim 7, wherein said method allows for up to 360° inkjet printing of the aircraft.

14. A method of inkjet printing an exterior surface of a vehicle, comprising:

preparing at least a portion of the exterior surface of the vehicle in a first bay using crossflow or downflow air handling and using explosion protected equipment;

inkjet printing at least the portion of the exterior surface of the vehicle in a second bay;

closing doors between the first bay and the second bay before preparing;

opening doors between the first bay and the second bay after preparing;

moving the vehicle from the first bay to the second bay after opening doors between the first bay and the second bay;

closing doors between the first bay and the second bay before inkjet printing;

clear-coating at least the portion of the exterior surface of the vehicle in a third bay using downflow or crossflow air handling, using air filtration and using explosion protected equipment;

opening doors between the second bay and the third bay after inkjet printing;

moving the vehicle from the second bay to the third bay after opening doors between the second bay and the third bay;

closing doors between the second bay and the third bay before clear-coating; and mechanically connecting the vehicle to a first reversibly moveable crossbeam before inkjet printing, wherein the first reversibly moveable crossbeam is located in the second bay in an open pit and the first reversibly moveable crossbeam is reversibly movable along a length of the open pit, wherein the first reversibly moveable crossbeam spans the open pit, and the vehicle is located on the first reversibly moveable crossbeam.

15. The method of claim 14, further comprising removing paint and inspecting at least the portion of the exterior surface of the vehicle in a fourth bay before preparing.

16. The method of claim 14, wherein preparing comprises activating, adhesion promoting, priming, and base-coating.

17. The method of claim 14, further comprising moving the first reversibly moveable crossbeam and the vehicle.

18. The method of claim 17, further comprising mechanically connecting the vehicle to a second reversibly moveable crossbeam, wherein the second bay comprises a first track located above both the first reversibly moveable crossbeam and the second reversibly moveable crossbeam.

19. The method of claim 18, further comprising moving the first reversibly moveable crossbeam, the second reversibly moveable crossbeam and the vehicle, wherein the second reversibly moveable crossbeam spans the open pit, and the vehicle is located on the second reversibly moveable crossbeam.

20. A method of inkjet printing an exterior surface of a vehicle, comprising:

preparing at least a portion of the exterior surface of the vehicle in a first bay using crossflow or downflow air handling and using explosion protected equipment;

inkjet printing at least the portion of the exterior surface of the vehicle in a second bay;

clear-coating at least the portion of the exterior surface of the vehicle in a third bay using downflow or crossflow air handling, using air filtration and using explosion protected equipment; and mechanically connecting the vehicle to a first reversibly moveable crossbeam before inkjet printing, wherein the first reversibly moveable crossbeam is located in the second bay in an open pit and the first reversibly moveable crossbeam is reversibly movable along a length of the open pit, wherein the portion of the exterior surface of the vehicle comprises at least one curved surface, and wherein preparing comprises activating, adhesion promoting, priming, and base-coating, wherein the first reversibly moveable crossbeam spans the open pit, and the vehicle is located on the first reversibly moveable crossbeam.

21. A method of inkjet printing an exterior surface of a vehicle, comprising:

preparing at least a portion of the exterior surface of the vehicle in a first bay using crossflow or downflow air handling and using explosion protected equipment;

inkjet printing at least the portion of the exterior surface of the vehicle in a second bay;

clear-coating at least the portion of the exterior surface of the vehicle in a third bay using downflow or crossflow air handling, using air filtration and using explosion protected equipment; and mechanically connecting the vehicle to a first reversibly moveable crossbeam before inkjet printing, wherein the first reversibly moveable crossbeam is located in the second bay in an open pit and the first reversibly moveable crossbeam is reversibly movable along a length of the open pit, and wherein preparing comprises activating, adhesion promoting, priming, and base-coating, wherein the first reversibly moveable crossbeam spans the open pit, and the vehicle is located on the first reversibly moveable crossbeam.

* * * * *